United States Patent
Shi et al.

(10) Patent No.: US 10,704,404 B2
(45) Date of Patent: Jul. 7, 2020

(54) SEALS FOR A GAS TURBINE ENGINE ASSEMBLY

(71) Applicants: Rolls-Royce Corporation, Indianapolis, IN (US); Rolls-Royce North American Technologies, Inc., Indianapolis, IN (US)

(72) Inventors: Jun Shi, Carmel, IN (US); Ted J. Freeman, Danville, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 877 days.

(21) Appl. No.: 15/076,127

(22) Filed: Mar. 21, 2016

(65) Prior Publication Data

US 2016/0319686 A1 Nov. 3, 2016

Related U.S. Application Data

(60) Provisional application No. 62/155,216, filed on Apr. 30, 2015.

(51) Int. Cl.
*F01D 11/00* (2006.01)
*F01D 25/14* (2006.01)
(Continued)

(52) U.S. Cl.
CPC .............. *F01D 11/005* (2013.01); *F01D 9/02* (2013.01); *F01D 25/145* (2013.01); *F01D 25/28* (2013.01); *F23R 3/007* (2013.01); *F23R 3/60* (2013.01); *F05D 2220/32* (2013.01); *F05D 2240/11* (2013.01); *F05D 2240/35* (2013.01);
(Continued)

(58) Field of Classification Search
CPC .... F01D 11/005; F01D 11/006; F01D 25/145; F01D 25/28; F01D 9/02; F23R 3/007; F23R 3/60; F05D 2240/35; F05D 2220/32; F05D 2240/11; F05D 2240/55; F05D 2250/11; F05D 2250/61; F05D 2250/75; F05D 2260/20
See application file for complete search history.

(56) References Cited

U.S. PATENT DOCUMENTS

| | | |
|---|---|---|
| 3,728,041 A | 4/1973 | Bertelson |
| 5,088,888 A | 2/1992 | Bobo |

(Continued)

FOREIGN PATENT DOCUMENTS

| | | |
|---|---|---|
| GB | 2280935 A | 2/1995 |
| JP | 2013 155681 A | 8/2013 |

OTHER PUBLICATIONS

European Official Action dated Sep. 10, 2018 issued in connection with European Patent Appln. No. 16161190.0, 5 pages.
(Continued)

*Primary Examiner* — Kenneth Bomberg
*Assistant Examiner* — Julian B Getachew
(74) *Attorney, Agent, or Firm* — Barnes & Thornburg LLP

(57) ABSTRACT

A gas turbine engine assembly adapted to separate a high pressure zone from a low pressure zone includes a pressure-activated seal. The pressure-activated seal is arranged in a channel formed between a first component and a second component that opens toward the high pressure zone.

25 Claims, 2 Drawing Sheets

(51) Int. Cl.
*F01D 25/28* (2006.01)
*F01D 9/02* (2006.01)
*F23R 3/00* (2006.01)
*F23R 3/60* (2006.01)

(52) U.S. Cl.
CPC ...... *F05D 2240/55* (2013.01); *F05D 2250/11* (2013.01); *F05D 2250/61* (2013.01); *F05D 2250/75* (2013.01); *F05D 2260/20* (2013.01); *F05D 2300/6033* (2013.01); *Y02T 50/672* (2013.01); *Y02T 50/675* (2013.01)

(56) References Cited

U.S. PATENT DOCUMENTS

| | | |
|---|---|---|
| 5,338,152 A | 8/1994 | Feldman |
| 5,458,343 A | 10/1995 | Dornfeld et al. |
| 5,513,955 A * | 5/1996 | Barcza ............ F01D 5/22 416/193 A |
| 5,709,530 A | 1/1998 | Cahill et al. |
| 6,273,683 B1 | 8/2001 | Zagar et al. |
| 6,893,214 B2 | 5/2005 | Alford et al. |
| 7,771,159 B2 | 8/2010 | Johnson et al. |
| 7,798,769 B2 | 9/2010 | Keller |
| 8,132,442 B2 | 3/2012 | Merrill et al. |
| 8,137,826 B2 | 3/2012 | Louchet-Pouillerie et al. |
| 8,206,087 B2 | 6/2012 | Campbell et al. |
| 8,534,995 B2 | 9/2013 | McCaffrey |
| 2004/0165983 A1 | 8/2004 | Elliott et al. |

OTHER PUBLICATIONS

Extended European Search Report, European Application No. 16161190.0-1610, dated Sep. 12, 2016, 7 pages.
European Office Action, dated Oct. 4, 2019 in connection with European Application No. 16161190.0, 4 pages.

* cited by examiner

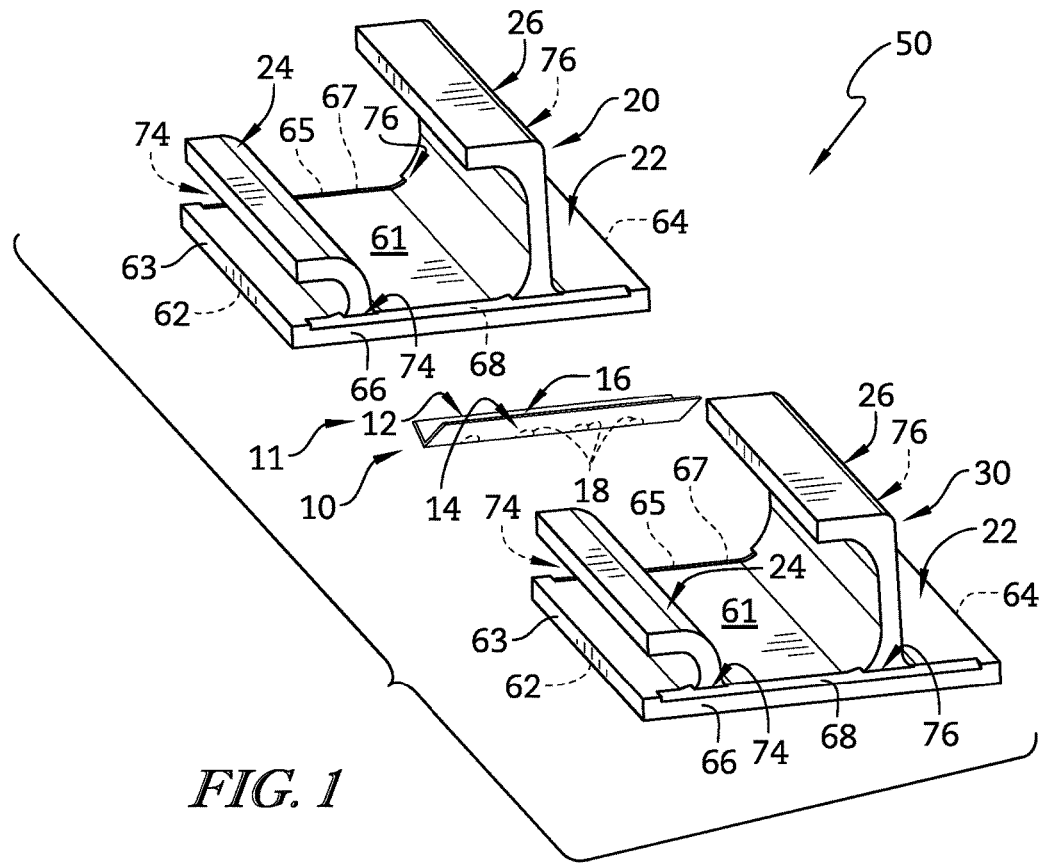
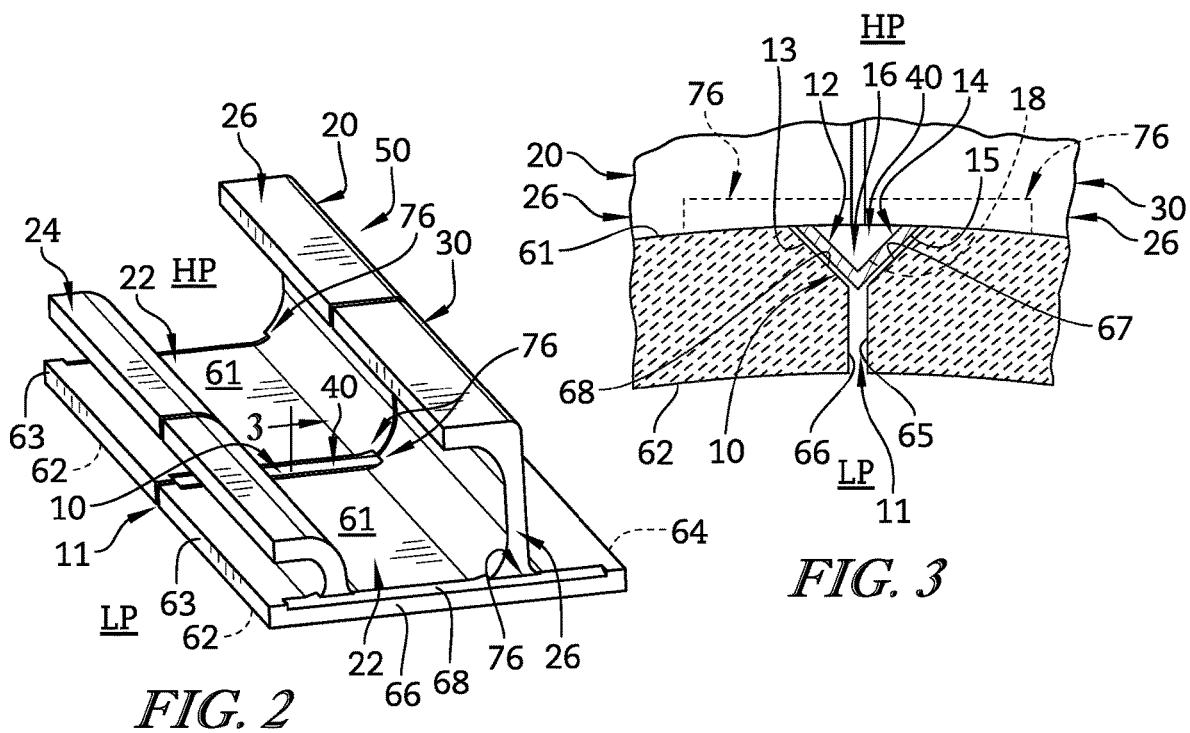

SEALS FOR A GAS TURBINE ENGINE ASSEMBLY

CROSS REFERENCE TO RELATED APPLICATIONS

This application claims priority to and the benefit of U.S. Provisional Patent Application No. 62/155,216, filed 30 Apr. 2015, the disclosure of which is now expressly incorporated herein by reference.

FIELD OF THE DISCLOSURE

The present disclosure relates generally to gas turbine engines, and more specifically to seals used in gas turbine engines.

BACKGROUND

Gas turbine engines are used to power aircraft, watercraft, power generators, and the like. Adjacent components in a gas turbine engine are often separated by a small gap. The small gap allows for variations in manufacturing tolerance of the adjacent components and for expansion/contraction of the components that occurs during operation of the gas turbine engine. Expansion and contraction of the adjacent components is typically caused by the selection of different materials for each component or by different temperatures experienced by each component.

The small gaps between adjacent components may be sealed to prevent the leakage of air through the small gaps during operation of the turbine engine. Seals used to block the leakage of air through the small gaps are sometimes designed to account for changes in the dimension of the gap to be closed.

SUMMARY

The present disclosure may comprise one or more of the following features and combinations thereof.

According to the present disclosure, a gas turbine engine assembly may include a first component comprising ceramic matrix materials, a second component comprising ceramic matrix materials, and a seal. The first component may include a panel arranged to separate a high pressure zone from a low pressure zone and may be formed to include a first chamfer surface that extends from a high pressure surface of the first component facing the high pressure zone to a first side surface of the first component. The second component may include a panel arranged to separate the high pressure zone from the low pressure zone and may be formed to include a second chamfer surface that extends from a high pressure surface of the second component facing the high pressure zone to a second side surface of the first component.

In illustrative embodiments, the seal may be arranged in a channel formed by the first chamfer and the second chamfer when the first side surface of the first component is arranged in confronting relation to the second side surface of the second component. The seal may have a first seal surface that contacts the first chamfer surface and a second surface that contacts the second chamfer surface. The seal may be shaped to be pushed into contact with the first chamfer surface and the second chamfer surface by pressure in the high pressure zone so that the seal resists gasses moving through a gap between the first side surface of the first component and the second side surface of the second component.

In illustrative embodiments, the seal may have a first leg that provides the first seal surface and a second leg that provides the second seal surface. The seal may be shaped to form a trough between the first leg and the second leg. The seal may be arranged so that the trough is open to the high pressure zone.

In illustrative embodiments, the seal may have a substantially V-shaped cross-section. In illustrative embodiments, the first leg and the second leg may each have a curved shaped cross-section.

In illustrative embodiments, the seal may be formed to include a bleed feature configured to allow a predetermined amount of gas to pass through the seal. The bleed feature may include a plurality of bleed channels formed in the first seal surface and the second seal surface. The seal may have a first leg and a second leg that extends from the first leg to form a trough between the first leg and the second leg. The seal may be arranged so that the trough is open to the high pressure zone. Both the first leg and the second leg may be corrugated to form the plurality of bleed channels.

In illustrative embodiments, the bleed feature may include a plurality of holes formed in the seal. The plurality of holes may be arranged about midway between the first seal surface and the second seal surface.

In illustrative embodiments, the first chamfer surface may extend only partway along the first side surface of the panel included in the first component and may be spaced apart from both a forward side surface and an aft side surface of the panel included in the first component. The second chamfer surface may extend only partway along the second side surface of the panel included in the second component and may be spaced apart from both a forward side surface and an aft side surface of the panel included in the second component.

In illustrative embodiments, the first component may include a plurality of retention features that extend over corresponding portions of the channel to block the seal from movement out of the channel. The second component may include a plurality of retention features that extend over corresponding portions of the channel to block the seal from movement out of the channel.

In illustrative embodiments, the retention features of the first component may be integral to attachment features included in the first component that are configured to couple the panel of the first component to a surrounding structure. The retention features of the second component may be integral to attachment features included in the second component that are configured to couple the panel of the second component to a surrounding structure.

According to another aspect of the present disclosure, a gas turbine engine assembly may include a first component, a second component, and a seal. The first component may include a panel arranged to separate a high pressure zone from a low pressure zone. The second component may also include a panel arranged to separate the high pressure zone from the low pressure zone.

In illustrative embodiments, the seal may be arranged in a channel formed between the first component and the second component that opens toward the high pressure zone. The seal may have a first seal surface that contacts the first component and a second surface that contacts the second component. The seal may be shaped to be pushed into contact with the first component and the second component by pressure in the high pressure zone.

In illustrative embodiments, the seal may have a first leg that provides the first seal surface and a second leg that provides the second seal surface. The seal may be shaped to form a trough between the first leg and the second leg. The seal may be arranged so that the trough is open to the high pressure zone.

In illustrative embodiments, the seal may have a substantially V-shaped cross-section. The first leg and the second leg may each have a curved shaped cross-section.

In illustrative embodiments, the channel may extends only partway along an interface between the first component and the second component.

In illustrative embodiments, the first component may include a plurality of retention features that extend over portions of the channel to block the seal from movement out of the channel. The second component may also include a plurality of retention features that extend over portions of the channel to block the seal from movement out of the channel.

In illustrative embodiments, the retention features of the first component may be integral to attachment features included in the first component that are configured to couple the panel of the first component to a surrounding structure. The retention features of the second component may be integral to attachment features included in the second component that are configured to couple the panel of the second component to a surrounding structure.

In illustrative embodiments, the seal may be formed to include a bleed feature configured to allow a predetermined amount of gas to pass through the seal.

These and other features of the present disclosure will become more apparent from the following description of the illustrative embodiments.

BRIEF DESCRIPTION OF THE DRAWINGS

FIG. 1 is an exploded perspective view of a gas turbine engine assembly including a first component, a second component, and a seal adapted to block gasses from passing through a gap formed at an interface between the first component and the second component;

FIG. 2 is a perspective view of the gas turbine engine assembly from FIG. 1 assembled to show that the seal is received in a channel formed between the first component and the second component;

FIG. 3 is a cross sectional view of a portion of FIG. 2 showing that the first component and the second component illustratively comprise ceramic materials, showing that the channel formed by the first component and the second component opens to a high pressure zone, and showing that the seal is shaped to be pressure activated into contact with the first component and the second component by gasses in the high pressure zone;

DETAILED DESCRIPTION

Figure 4:
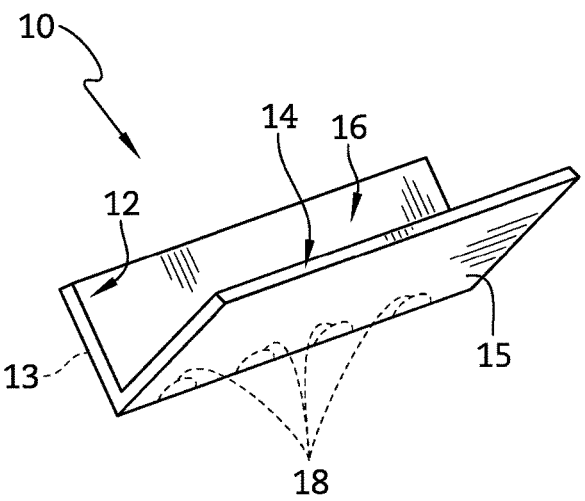
FIG. 4 is an enlarged perspective view of the seal from FIGS. 1-3 showing that the seal includes a first leg and a second leg that cooperate to form a trough for receiving gasses from the high pressure zone.

For the purposes of promoting an understanding of the principles of the disclosure, reference will now be made to a number of illustrative embodiments shown in the drawings and specific language will be used to describe the same.

A pressure-activated seal 10 is adapted to close a gap 11 between first and second adjacent components 20, 30 in a gas turbine engine assembly 50 that separates a high pressure zone HP from a low pressure zone LP as shown in FIGS. 1-3. The seal 10 is arranged in a channel 40 formed by the adjacent components 20, 30 that opens toward the high pressure zone HP as shown in FIG. 3. Gasses in the high pressure zone HP act on the seal 10 to push the seal 10 into contact with the components 20, 30 so that the seal 10 resists gasses moving through the gap 11 between the first component 20 and the second component 30 as shown, for example, in FIG. 3.

Each of the components 20, 30 are substantially similar and each includes a panel 22, a first hanger 24, and a second hanger 26 as shown in FIGS. 1 and 2. The panel 22 separates the high pressure zone HP from the low pressure zone LP. The first and the second hangers 24, 26 are configured to be coupled to structure surrounding the gas turbine engine assembly 50. In the illustrative embodiment, the components 20, 30 are blade track segments made from ceramic matrix materials that may be used with other blade track segments to provide a ring that extends around rotating turbine wheels used in gas turbine engines. However, the components 20, 30 may be made from other materials and/or may be adapted for use as combustor tiles included in the combustor of a gas turbine engine or as heat shields included in other sections of a gas turbine engine.

The panel 22 of the components 20, 30 is illustratively formed to include a high pressure surface 61 that faces the high pressure zone HP and a low pressure surface 62, opposite the high pressure surface 61, that faces the low pressure zone LP as shown in FIGS. 2 and 3. The panel 22 is also formed to include a forward side surface 63, an aft side surface 64, a left side surface 65, and a right side surface 66 as shown in FIGS. 1 and 2. Additionally, in the illustrative embodiment, the panel 22 is formed to include a left chamfer surface 67 that extends at an angle from the high pressure surface 61 to the left side surface 65 of the panel 22 and a right chamfer surface 68 that extends at an angle from the high pressure surface 61 to the right side surface 66 of the panel 22. The chamfer surfaces 67, 68 may be generally flat or barreled (curved).

When assembled, the first component 20 and the second component 30 are arranged adjacent to one another so that the right side surface 66 of the first component 20 is in confronting relation with the left side surface 65 of the second component 30 as shown in FIG. 3. The right chamfer surface 68 of the first component 20 then cooperates with the left chamfer surface 67 of the second component 30 to create the channel 40 opening entirely toward the high pressure zone HP that receives the seal 10 as shown in FIG. 3. The chamfer surfaces 67, 68 only extend partway along the corresponding left and right side surfaces 65, 66 and are spaced from the forward and aft surfaces 63, 64; accordingly, the channel 40 only extends partway between and is spaced from the forward and aft surfaces 63, 64 of the panels 22 included in the first and the second components 20, 30.

The channel 40 is illustratively shaped with straight sides forming a generally triangular space for the seal 10 but may have curved or otherwise shaped sides that provide a space for the seal 10.

The first and the second hangers 24, 26 are integral with the panels 22 of the first and the second components 20, 30 and are adapted for coupling the panels 22 of the first and the second component 20, 30 with structure surrounding the gas turbine engine assembly 50 as shown in FIGS. 1 and 2. In the illustrative embodiment, the first and the second hangers 24, 26 have a generally L-shape adapted to hang from brackets in a support structure. In other embodiments, the first and the second hangers may be dovetail shaped, may have pin-receiving holes, or have any other suitable shape for coupling the assembly 50 with other structures.

In addition to providing means for attaching the assembly 50 to other structures, the first and second hangers 24, 26 each extend over a portion of the channel 40 to provide retention tabs 74, 76 as shown in FIGS. 1-3. The retention tabs 74, 76 provide features that block the seal 10 from movement out of the channel 40 toward the high pressure zone HP (e.g. when the zones HP, LP around the assembly 50 are not pressurized by operation of a gas turbine engine). In some embodiments, the retention tabs 74, 76 may be independent of the first and the second hangers 24, 26 while still being integrated with the panels 22 of the first and the second components 20, 30.

The seal 10 illustratively comprises a sheet of metallic materials having a substantially constant thickness as shown in FIGS. 3 and 4. While the seal 10 is illustratively shown as a metallic component, it may also be made from other materials including but not limited to ceramic-containing materials. The seal 10 is formed or bent to include a first leg 12 and a second leg 14 that cooperate to form a trough 16 opening in its entirety toward the high pressure zone HP. The legs 12, 14 illustratively extend from one another so that the seal 10 has a generally V-shaped cross section but may be spaced apart by an intervening member in some embodiments. In other embodiments, a floor may extend between the legs 12, 14 so that the legs 12, 14 are spaced apart from one another.

The first leg 12 provides a first sealing surface 13 that contacts the right chamfer surface 68 of the first component 20 when pushed by gas in the high pressure zone HP. The second leg 14 provides a second sealing surface 15 that contacts the left chamfer surface 67 of the second component 30 when pushed by gas in the high pressure zone HP.

In some embodiments, the seal 10 may include optional holes 18 that provide a bleed feature for allowing a predetermined amount of flow to move through the seal 10 as shown in FIGS. 3 and 4. The holes 18 may be arranged about midway between the first and the second components 20, 30 at the intersection of the first and the second legs 12, 14. In other embodiments, the holes 18 may be arranged at a different location.

Because of the pressure differentials between the low pressure zone LP (often a hot gas flow path) and the high pressure zone HP (often a cooled side of assemblies like 50), cooling air can flow through small gaps 11 between components. The small gaps accelerate flow velocity and can create high local cooling effect. The localized cooling can generate high temperature gradients and thermal stresses. Due to the high strength of metallic alloys, such components can withstand the resulting thermal stresses. However, components comprising ceramic matrix materials may require sealing like that provided by the pressure activated seal 10 disclosed herein.

Ceramic matrix composite containing components (CMCs) often offer higher temperature capability than the metallic alloys and they are being investigated for applications in turbine vanes, seal segments, and blades. CMCs, however, can require protection from water vapor attack through an environmental barrier coating (EBC). Because of the small dimensions of strip seal grooves, it may be hard to deposit quality coating inside strip seal grooves using air plasma spray and to machine the grooves. Accordingly, the design of alternative features for locating seals in assemblies including CMCs can be desirable.

Figure 5:
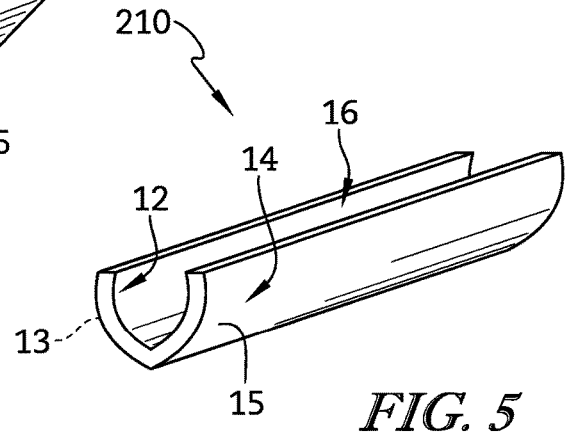
FIG. 5 is an enlarged perspective view of a first alternative seal showing that the seal includes a first barreled (or curved) leg and a second barreled (or curved) leg.

A second illustrative seal 210 adapted for use in place of the seal 10 as part of the gas turbine engine assembly 50 is shown in FIG. 5. The seal 210 illustratively comprises metallic materials and includes a first leg 212 and a second leg 214 that cooperate to form a trough 216. The legs 212, 214 illustratively extend from one another but may be spaced apart by an intervening member in some embodiments. The first leg 212 provides a first sealing surface 213 that would contact the right chamfer surface 68 of the first component 20 when pushed by gas in the high pressure zone HP. The second leg 214 provides a second sealing surface 215 that would contact the left chamfer surface 67 of the second component 30 when pushed by gas in the high pressure zone HP. The legs 212, 214 are barreled or curved to encourage sealing contact when assembled with the components 20, 30 of the assembly 50. While the seal 210 is illustratively shown as a metallic component, it may also be made from other materials including but not limited to ceramic-containing materials.

Figure 6:
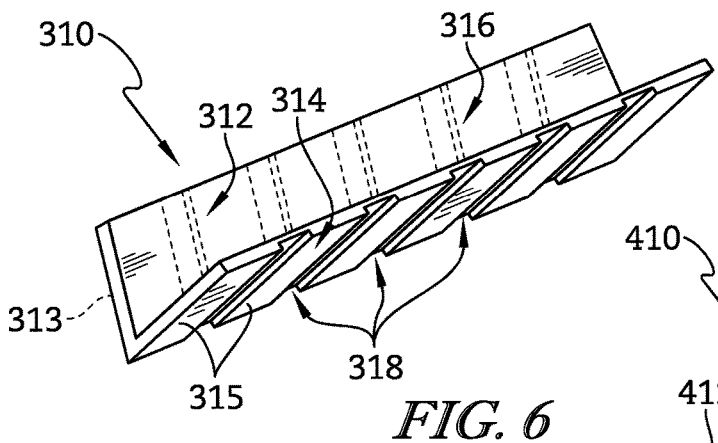
FIG. 6 is an enlarged perspective view of a second alternative seal showing that the seal includes a first leg having bleed channels formed therein and a second leg having bleed channels formed therein.

A third illustrative seal 310 adapted for use in place of the seal 10 as part of the gas turbine engine assembly 50 is shown in FIG. 6. The seal 310 illustratively comprises metallic materials and includes a first leg 312 and a second leg 314 that cooperate to form a trough 316. The legs 312, 314 illustratively extend from one another so that the seal 310 forms a V-shaped cross section but may be spaced apart by an intervening member in some embodiments. The first leg 312 provides sealing surfaces 313 that would contact the right chamfer surface 68 of the first component 20 when pushed by gas in the high pressure zone HP. The second leg 314 provides sealing surfaces 215 that would contact the left chamfer surface 67 of the second component 30 when pushed by gas in the high pressure zone HP. The legs 312, 314 are formed to include bleed channels 318 that provide a bleed feature for allowing a predetermined amount of flow through the seal 310 when used with the components 20, 30 in the assembly 50. While the seal 310 is illustratively shown as a metallic component, it may also be made from other materials including but not limited to ceramic-containing materials.

Figure 7:
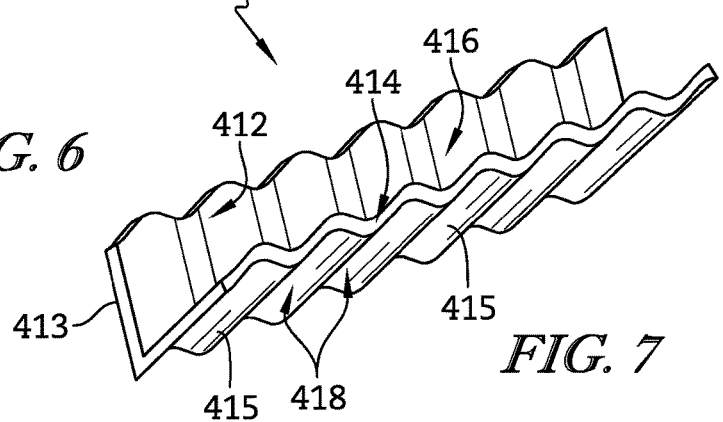
FIG. 7 is an enlarged perspective view of a third alternative seal showing that the seal includes a first corrugated leg and a second corrugated leg.

A fourth illustrative seal 410 adapted for use in place of the seal 10 as part of the gas turbine engine assembly 50 is shown in FIG. 7. The seal 410 illustratively comprises metallic materials and includes a first leg 412 and a second leg 414 that cooperate to form a trough 416. The legs 412, 414 illustratively extend from one another so that the seal 410 forms a V-shaped cross section but may be spaced apart by an intervening member in some embodiments. The first leg 412 provides sealing surfaces 413 that would contact the right chamfer surface 68 of the first component 20 when pushed by gas in the high pressure zone HP. The second leg 414 provides sealing surfaces 215 that would contact the left chamfer surface 67 of the second component 30 when pushed by gas in the high pressure zone HP. The legs 412, 414 are corrugated to include bleed channels 418 that provide a bleed feature for allowing a predetermined amount of flow through the seal 410 when used with the components 20, 40 in the assembly 50. While the seal 410 is illustratively shown as a metallic component, it may also be made from other materials including but not limited to ceramic-containing materials.

Figure 8:
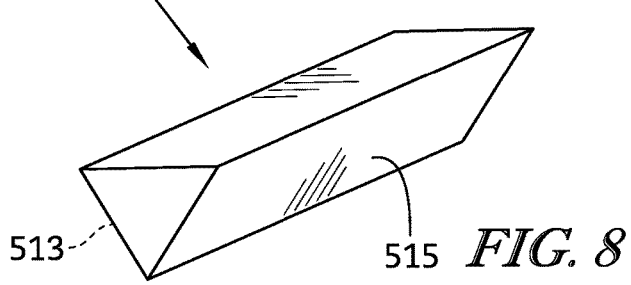
FIG. 8 is an enlarged perspective view of a fourth alternative seal showing that the seal has a generally triangular cross section.

A fifth illustrative seal 510 adapted for use in place of the seal 10 as part of the gas turbine engine assembly 50 is shown in FIG. 8. The seal 510 illustratively comprises metallic materials and has a generally triangular cross section. The seal 510 provides sealing surfaces 513, 515 that would contact the chamfer surfaces 67, 68 of the components 20, 30 when pushed by gas in the high pressure zone HP. While the seal 510 is illustratively shown as a metallic component, it may also be made from other materials including but not limited to ceramic-containing materials.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising
a first component comprising ceramic matrix materials, the first component including a panel arranged to separate a high pressure zone from a low pressure zone and a plurality of hangers that extend radially outward from the panel and are configured to couple the panel of the first component to a surrounding structure, the panel formed to include a first chamfer surface that extends from a radially-outwardly facing surface of the first component facing the high pressure zone to a first circumferentially-facing side surface of the first component,
a second component comprising ceramic matrix materials, the second component including a panel arranged to separate the high pressure zone from the low pressure zone and a plurality of hangers that extend radially outward from the panel and are configured to couple the panel of the second component to the surrounding structure, the panel formed to include a second chamfer surface that extends from a radially-outwardly facing surface of the second component facing the high pressure zone to a second circumferentially-facing side surface of the second component, and
a seal arranged in a channel formed by the first chamfer surface and the second chamfer surface when the first circumferentially-facing side surface of the first component is arranged in confronting relation to the second circumferentially-facing side surface of the second component, the seal having a first seal surface that contacts the first chamfer surface and a second seal surface that contacts the second chamfer surface, and the seal shaped to be pushed into contact with the first chamfer surface and the second chamfer surface by pressure in the high pressure zone so that the seal resists gasses from moving through a gap between the first circumferentially-facing side surface of the first component and the second circumferentially-facing side surface of the second component,
wherein the first chamfer surface extends only partway along the first side surface of the panel included in the first component, the first chamfer surface having a first end that is spaced apart from a forward side surface of the panel included in the first component and a second end spaced part from an aft side surface of the panel included in the first component, and the plurality of hangers of the first component are arranged axially between the first end and the second end of the first chamfer surface,
wherein the second chamfer surface extends only partway along the second side surface of the panel included in the second component, the second chamfer surface having a first end that is spaced apart from a forward side surface of the panel included in the second component and a second end spaced apart from an aft side surface of the panel included in the second component, and the plurality of hangers of the second component are arranged axially between the first end and the second end of the second chamfer surface,
wherein the plurality of hangers of the first component includes a first hanger and a second hanger spaced apart axially from the first hanger of the first component, the first hanger of the first component includes a first retention tab that extends over the channel to block the seal from movement out of the channel, and the second hanger of the first component includes a second retention tab that extends over the channel to block the seal from movement out of the channel, and
wherein the plurality of hangers of the second component includes a first hanger and a second hanger spaced apart axially from the first hanger of the second component, the first hanger of the second component includes a first retention tab that extends over the channel to block the seal from movement out of the channel, and the second hanger of the second component includes a second retention tab that extends over the channel to block the seal from movement out of the channel.

2. The assembly of claim 1, wherein the seal has a first leg that provides the first seal surface and a second leg that provides the second seal surface, the seal is shaped to form a trough between the first leg and the second leg, and the seal is arranged so that the trough is open to the high pressure zone.

3. The assembly of claim 2, wherein the seal has a V-shaped cross-section.

4. The assembly of claim 2, wherein the first leg and the second leg each have a curved shaped cross-section.

5. The assembly of claim 2, wherein the first and second retention tabs of the first component and the first and second retention tabs of the second component block the first leg and the second leg of the seal from extending radially outward past the radially-outwardly facing surface of the first component and radially-outwardly facing surface of the second component.

6. The assembly of claim 1, wherein the seal is formed to include a bleed feature configured to allow a predetermined amount of gas to pass through the seal.

7. The assembly of claim 6, wherein the bleed feature includes a plurality of bleed channels formed in the first seal surface and the second seal surface.

8. The assembly of claim 7, wherein the seal has a first leg and a second leg that extends from the first leg to form a trough between the first leg and the second leg, the seal is arranged so that the trough is open to the high pressure zone, and both the first leg and the second leg are corrugated to form the plurality of bleed channels.

9. The assembly of claim 6, wherein the bleed feature includes a plurality of holes formed in the seal.

10. The assembly of claim 9, wherein the plurality of holes are arranged midway between the first seal surface and the second seal surface.

11. A gas turbine engine assembly comprising
a first component including a panel arranged to separate a high pressure zone from a low pressure zone, a first chamfer surface that extends from a radially-outwardly facing surface of the first component to a first circumferentially-facing side surface of the first component, and a plurality of attachment features that extend radially outward from the radially-outwardly facing surface of the panel of the first component and are configured to couple the first component to a surrounding structure,
a second component including a panel arranged to separate the high pressure zone from the low pressure zone, a second chamfer surface that extends from a radially-outwardly facing surface of the second component to a second circumferentially-facing side surface of the second component, and a plurality of attachment features that extend radially outward from the radially-outwardly facing surface of the panel of the second component and are configured to couple the second component to the surrounding structure, and
a seal arranged in a channel formed by the first chamfer surface and the second chamfer surface between the first component and the second component that opens toward the high pressure zone, the seal having a first seal surface that contacts the first component and a second seal surface that contacts the second component, and the seal shaped to be pushed into contact with the first component and the second component by pressure in the high pressure zone,
wherein the channel extends only partway along an interface between the first component and the second component, and the plurality of attachment features of the first and second components are arranged axially along the channel between a first end of the channel and a second end of the channel spaced axially from the first end, and
wherein the first component includes a plurality of retention features that extend over portions of the channel located between the first end and the second end of the channel to block the seal from radial movement out of the channel and the second component includes a plurality of retention features that extend over portions of the channel located between the first end and the second end of the channel to block the seal from radial movement out of the channel.

12. The assembly of claim 11, wherein the seal has a first leg that provides the first seal surface and a second leg that provides the second seal surface, the seal is shaped to form a trough between the first leg and the second leg, and the seal is arranged so that the trough is open to the high pressure zone.

13. The assembly of claim 12, wherein the seal has a V-shaped cross-section.

14. The assembly of claim 12, wherein the first leg and the second leg each have a curved shaped cross-section.

15. The assembly of claim 12, wherein the first leg and the second leg of the seal do not extend past the radially-outwardly facing surface of the first component and radially-outwardly facing surface of the second component out of the channel.

16. The assembly of claim 11, wherein the retention features of the first component are integral to the plurality of attachment features included in the first component and the retention features of the second component are integral to the plurality of attachment features included in the second component.

17. The assembly of claim 11, wherein the seal is formed to include a bleed feature configured to allow a predetermined amount of gas to pass through the seal.

18. The assembly of claim 11, wherein the plurality of attachment features of the first component are hangers that have an L-shape adapted to hang from brackets in a support structure, and the plurality of attachment features of the second component are hangers that have an L-shape adapted to hang from brackets in the support structure.

19. The assembly of claim 18, wherein the hangers of the first component include a first hanger and a second hanger spaced apart axially from the first hanger of the first component, the plurality of retention features of the first component includes a first retention tab formed integral with the first hanger of the first component and a second retention tab formed integral with the second hanger of the first component, and the first and second retention tabs of the first component each extends over the channel to block the seal from movement out of the channel, and wherein the hangers of the second component include a first hanger and a second hanger spaced apart axially from the first hanger of the second component, the plurality of retention features of the second component includes a first retention tab formed integral with the first hanger of the second component and a second retention tab formed integral with the second hanger of the second component, and the first and second retention tabs of the second component each extends over the channel to block the seal from movement out of the channel.

20. A gas turbine engine assembly comprising
a first component including a panel arranged to separate a first pressure zone from a second pressure zone and a plurality of attachment features that extend radially outward from the panel of the first component and are configured to couple the panel of the first component to a surrounding structure, the panel of the first component formed to include a first chamfer surface that extends from a radially-facing surface of the first component to a first circumferentially-facing side surface of the first component,
a second component including a panel arranged to separate the first pressure zone from the second pressure zone and a plurality of hangers that extend radially outward from the panel of the second component and are configured to couple the panel of the second component to the surrounding structure, the panel of the second component formed to include a second chamfer surface that extends from a radially-facing surface of the second component to a second circumferentially-facing side surface of the second component, and
a seal arranged in a channel formed by the first chamfer surface and the second chamfer surface when the first circumferentially-facing side surface of the first component is arranged in confronting relation to the second circumferentially-facing side surface of the second component, the seal having a first seal surface that contacts the first chamfer surface and a second seal surface that contacts the second chamfer surface, and the seal shaped to be pushed into contact with the first chamfer surface and the second chamfer surface by pressure in the first pressure zone so that the seal resists gasses from moving through a gap between the first circumferentially-facing side surface of the first component and the second circumferentially-facing side surface of the second component,
wherein the channel extends only partway along an interface between the first component and the second component, and the plurality of attachment features are arranged axially along the channel between a first end of the channel and a second end of the channel spaced axially from the first end.

21. The assembly of claim 20, wherein the radially-facing surface of the first component and the radially-facing surface of the second component both face radially-outward toward the first pressure zone.

22. The assembly of claim 21, wherein the seal has a first leg that provides the first seal surface and a second leg that provides the second seal surface, the seal is shaped to form a trough between the first leg and the second leg, and the seal is arranged so that the trough is open to the first pressure zone.

23. The assembly of claim 21, wherein the first component includes a plurality of retention features that extend over corresponding portions of the channel to block the seal from movement out of the channel and the second component includes a plurality of retention features that extend over corresponding portions of the channel to block the seal from movement out of the channel.

24. The assembly of claim 23, wherein the retention features of the first component are integral to the plurality of attachment features included in the first component and the retention features of the second component are integral to the plurality of hangers included in the second component.

25. The assembly of claim 23, wherein the plurality of attachment features of the first component include a first attachment feature and a second attachment feature spaced apart axially from the first attachment feature of the first component, the plurality of retention features of the first component includes a first retention tab formed integral with the first attachment feature of the first component and a second retention tab formed integral with the second attachment feature of the first component, and the first and second retention tabs of the first component each extends over the channel to block the seal from movement out of the channel, and wherein the plurality of hangers of the second component include a first hanger and a second hanger spaced apart axially from the first hanger of the second component, the plurality of retention features of the second component includes a first retention tab formed integral with the first hanger of the second component and a second retention tab formed integral with the second hanger of the second component, and the first and second retention tabs of the second component each extends over the channel to block the seal from movement out of the channel.

\* \* \* \* \*